(12) United States Patent
Hunter

(10) Patent No.: US 6,734,122 B1
(45) Date of Patent: May 11, 2004

(54) FABRIC FOR HIGH-TEMPERATURE GASEOUS FILTRATION APPLICATIONS

(75) Inventor: Scott A. Hunter, Kernersville, NC (US)

(73) Assignee: BGF Industries, Inc., Greensboro, NC (US)

( * ) Notice: Subject to any disclaimer, the term of this patent is extended or adjusted under 35 U.S.C. 154(b) by 87 days.

(21) Appl. No.: 09/992,249

(22) Filed: Nov. 16, 2001

(51) Int. Cl.⁷ .................... B32B 27/12; B32B 17/04; B32B 3/28

(52) U.S. Cl. .............. 442/97; 442/98; 442/99; 442/103; 442/180; 442/301; 428/181

(58) Field of Search .............. 442/97, 103, 180, 442/99, 98, 301; 428/181

(56) References Cited

U.S. PATENT DOCUMENTS

| | | | |
|---|---|---|---|
| 2,546,230 A | 3/1951 | Modigliani | 154/92 |
| 2,758,671 A | 8/1956 | Silverman et al. | 183/49 |
| 3,003,581 A | 10/1961 | Greason | 183/49 |
| 3,112,184 A | 11/1963 | Hollenbach | 25/156 |
| 3,246,767 A | 4/1966 | Pall et al. | 210/505 |
| 3,262,810 A | 7/1966 | Campbell et al. | 117/126 |
| 3,410,062 A | 11/1968 | Hart | 55/497 |
| 3,631,582 A | 1/1972 | Lucas et al. | 29/419 |
| 3,745,748 A | 7/1973 | Goldfield et al. | 55/97 |
| 4,025,679 A | 5/1977 | Denny | 428/91 |
| 4,130,487 A | 12/1978 | Hunter et al. | 210/85 |
| 4,713,285 A | 12/1987 | Klein | 428/283 |
| 4,840,838 A | 6/1989 | Wyss | 428/234 |
| 4,917,714 A | 4/1990 | Kinsley, Jr. | 55/524 |
| RE33,272 E | 7/1990 | Turck | 55/500 |
| 5,064,598 A | 11/1991 | Seiler | 264/230 |
| 5,250,094 A | 10/1993 | Chung et al. | 55/523 |
| 5,389,121 A | 2/1995 | Pfeffer | 55/487 |
| 5,472,467 A | 12/1995 | Pfeffer | 55/488 |
| 5,549,966 A | 8/1996 | Sassa | 428/229 |
| 5,632,791 A | 5/1997 | Oussoren et al. | 55/486 |
| 5,634,954 A | 6/1997 | Kern | 55/487 |
| 5,667,611 A | 9/1997 | Sassa | 156/148 |
| 5,702,494 A | 12/1997 | Tompkins et al. | 55/498 |
| 5,730,766 A | 3/1998 | Clements | 55/341.1 |
| 5,800,586 A | 9/1998 | Cusick et al. | 55/486 |
| 5,876,537 A | 3/1999 | Hill et al. | 156/89.11 |
| 5,902,363 A | 5/1999 | Connolly et al. | 55/487 |
| 6,008,146 A * | 12/1999 | Stark | 442/199 |
| 2002/0006757 A1 * | 1/2002 | Wyss | 442/181 |

OTHER PUBLICATIONS

BHA Product Reference & Troubleshooting Guide, Nov. 16, 2001.

Johns Manville Aerospace Insulations Product Description for Microlite ® AA Uncured Moldable Fiber Glass Insulation, Nov. 16, 2001.

* cited by examiner

*Primary Examiner*—Ula C. Ruddock
(74) *Attorney, Agent, or Firm*—Womble Carlyle Sandridge & Rice, PLLC

(57) ABSTRACT

A fabric material for high temperature gaseous filtration applications, including a fabric material capable of withstanding temperatures of at least 450 degrees Fahrenheit for prolonged periods without deformation or deterioration, and a chemical stiffener that has been applied to the fabric.

44 Claims, 3 Drawing Sheets

FABRIC FOR HIGH-TEMPERATURE GASEOUS FILTRATION APPLICATIONS

FIELD OF THE INVENTION

The present invention is directed to fabric filter media for commercial and industrial applications, and more particularly, to a stiffened, pleated filter medium for high-temperature gaseous filtration applications.

BACKGROUND OF THE INVENTION

Over the last several decades, there has been an increased awareness and emphasis on environmental issues, including air and water quality. Increasingly strenuous governmental controls and limits have been imposed to preserve these natural resources and prevent associated health hazards.

Numerous advances have been made in effectively controlling air pollution by removing undesirable particular matter from gaseous processing streams and exhausts. One particular type of air filtration technique has been the employment of particulate collectors known as "baghouses". Baghouses operate much like a household vacuum cleaner. Dirty air is drawn into a chamber, or plenum, where a filter medium is positioned. The air passes through the filter into a clean air plenum, depositing the particulate matter, dust, etc. on the filter surfaces as it passes into the clean air plenum. Because of the high volumes of air being processed in industrial applications, these baghouses must be equently cleaned. Cleaning is typically conducted by reversing the flow of air or gas through from the clean air plenum into the dirty air plenum, dislodging the dust and particulate matter that has accumulated on the surfaces of the filter. In some industrial applications, these cleaning cycles must be repeated hundreds of times each day. As will be appreciated, the filters very quickly become structurally fatigued, tearing in short periods, thus requiring frequent, costly replacement.

The cleaning problems and failures of baghouse filters, including cartridge filters, are further exacerbated when the filters are installed in high temperature applications where the gaseous discharges exceed 450 degrees Fahrenheit. Fabric filter media very quickly deform and deteriorate, rapidly losing their structural rigidity and filtration efficiency. As a result, filtering high temperature gaseous discharges to meet regulatory requirements in a cost-effective manner, has been problematic.

SUMMARY OF THE INVENTION

The present invention is directed to a fabric filter material and a pleated filter formed therefrom that address the problems of filtering gaseous streams in high temperature applications; i.e., at temperatures between about 450 and 550 degrees Fahrenheit.

A preferred embodiment of the present invention provides a fabric material to which a stiffener is applied for maintaining the form (rigidity) of the fabric in the spectrum of high temperature applications. A fibrous fabric material that is capable of being stiffened and formed is selected. In this embodiment, the fibrous fabric is woven entirely from yarns of fiberglass, preferably type ECDE (continuous filament electrical grade) yarns in which a portion of both the fill and warp yarns are air-jet texturized. It has been found that using texturized yarns substantially increases the wet pickup of the fabric and facilitates the more precise forming (shaping) of the fabric. "Wet pickup" refers to the amount of a liquid finish, expressed as a percentage, that a finished fabric will absorb. The greater the wet pickup, the more effective the stiffener is in maintaining the form of the woven fabric during its anticipated high temperature service. It has also been found that fiberglass, as a filter material, retains superior durability after frequent and numerous fatigue cycles, and is quite adaptable to stiffening and forming.

The preferred stiffener is comprised of a resorcinol-formaldehyde resin solution, an acrylic resin emulsion, ammonia, hexamethylenetetramine, and water. The stiffener may be applied using any of the conventional methods known in the art for applying finishiners such as dipping, spraying, etc. Once the stiffener is applied, the treated fabric is heated until dry, but at a temperature and duration that will not exceed B-stage curing of the treated fabric. This allows the treated fabric to be later formed and set in a desired shape.

In a preferred embodiment, the stiffening system of the present invention includes three discrete layers that are sequentially applied to the woven fiberglass fabric, that is, two additional layers that complement the stiffener. An initial, or inner, layer serves as a lubricant for the subsequently applied stiffening layer and consists of water, a lubricant (desirably a silicon such as a phenyl silicone polymer because of its high temperature stability), and a polytetrafluorethylene (PTFE) dispersion. After the lubrication layer is applied, it is heated within a specified temperature range for a specified duration until dry. The stiffening layer is next applied. This layer is comprised of a resorcinol-formaldehyde resin solution, an acrylic resin emulsion, ammonia, hexamethylenetetramine, and water. The treated fabric is again heated until dry, but at a temperature and duration that will not exceed B-stage curing of the treated fabric. This allows the treated fabric to be later formed and set in a desired shape. Lastly, a protective layer is applied to the treated fabric, the protective layer consisting of a PTFE dispersion and water. The treated fabric is heated until dry, but again at a limited temperature and duration combination so that the fabric will not cure beyond the B-stage. The finished treated fabric may be immediately shaped and set, or may be stored in the B-stage for later forming.

In a preferred embodiment, the treated fabric is pleated as it is well known in the filtration arts that pleated filters provide substantially more (2 to 3 tires) filtration surface area for a selected filter size. Any of the known commercial pleating machines may be used to pleat the fabric. Sufficient heat and duration are required to set the pleats, fully curing and setting the treated fabric. An oven or infrared lights downstream of the pleating operation are employed to provide this curing, setting heat.

A further embodiment of the present invention is a filter device, such as a pleated cartridge filter, for high temperature filtration applications. Such a cartridge filter is easily adapted to the baghouse filter systems described above. The filter device is comprised of a perforated liner, a generally circular pleated portion of treated, stiffened fabric, at least one retainer, and end flanges. The perforated liner is preferably a metallic cylinder with open ends and perforations formed through and spaced about the cylinder walls. The perforations are sized and spaced to optimize the flow of air into the clean air plenum after passing through the pleated filter. The most important function served by the liner, however, is structural support for the surrounding fabric filter. Completely surrounding the outer wall surface of the cylindrical liner is the pleated fabric filter material. At least one retainer, such as a band, strap, wire, etc. holds the filter material in place around the cylindrical liner. This especially provides additional rigidity and support to the filter material during the frequent cleaning cycles which force air in a reverse flow through the liner and back across the filter material to dislodge trapped particulate. Finally, to secure the upper and lower free ends, or edges, of the pleated filter, caps or flanges are fitted around the ends or edges and adhered to the fabric with a conventional potting compound known in the art and adapted for high temperature applications.

The fabric filter material treated and formed as described hereinabove and in accordance with the detailed description that follows, is capable of achieving a filtration efficiency of greater than 99% for particulate matter of 10 microns or greater. Further, when pleated and incorporated into a filter device, such as a filter cartridge, the fabric filter material can withstand thousands of cleaning cycles without failure.

These and other aspects of the present invention will become apparent to those skilled in the art after a reading of the following description of the preferred embodiments when considered with the drawings.

DETAILED DESCRIPTION OF THE PREFERRED EMBODIMENTS

Figure 1:
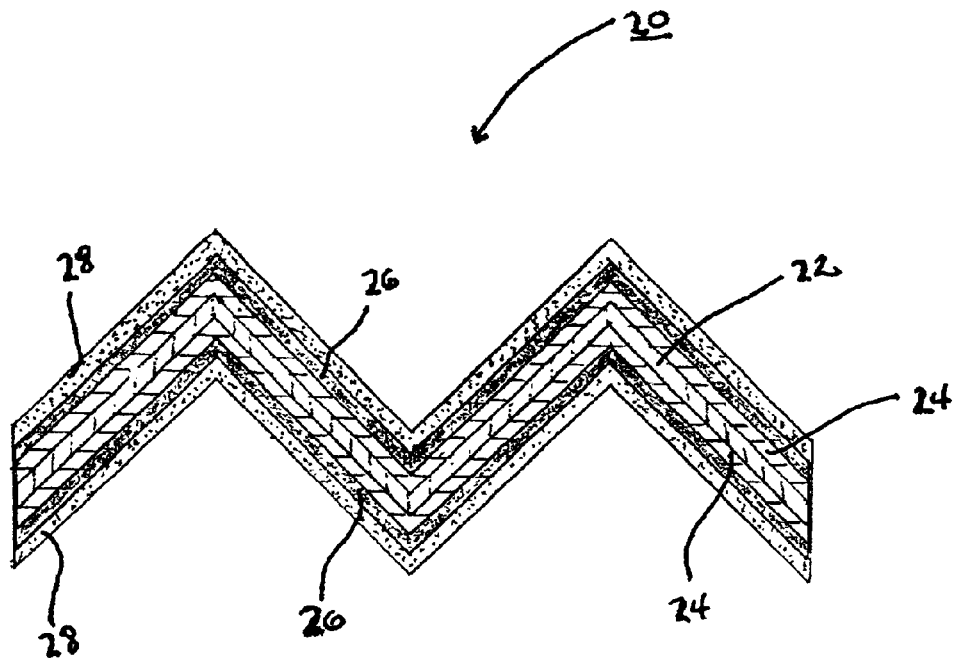
FIG. 1 is a cross-sectional view of the woven fabric filter material of the present invention, illustrating the three layers of the stiffening system applied thereto and a pleated shape.

Referring now to FIG. 1, a schematic cross-sectional view of the treated fabric material of the present invention for use in high temperature applications is shown generally as 10.

While many suitable yarns and non-textile materials may be used for forming conventional filtration media for low temperature (ambient) residential and commercial applications, materials suitable for prolonged high-temperature duty (between about 450 and 550 degrees Fahrenheit) are not conventionally known. Fiberglass is well known in the art for its suitability in withstanding elevated temperatures; however, at high temperatures, untreated fiberglass rapidly loses its form and quickly deteriorates. It has been found, however, that a stiffening system applied to a fiberglass fabric solves this problem.

A preferred embodiment of the present invention begins with forming a woven, 100 percent fiberglass fabric; however, the fabric for the present invention need not be limited to a woven construction. The warp yarns are comprised of one end of ECDE 37 1/0 filament and one end of ECDE 75 1/0 texturized. The fill yarns are comprised of three ends of ECDE 75 1/3 texturized. As those skilled in the art will appreciate, these yarns are formed from type DE continuous, electrical grade fiberglass filaments; hence ECDE. ECDE 37 and 75 comprise 3,700 and 7,500 yards of yarn per pound, respectively. The designation 1/0, well known in the art, means that 1 strand is using in making the yarn, and 0 means that no twisted strands are plied together in this construction; 1/3 means that 1 strand is used in making the yarn and 3 twisted strands are plied together. Alternately, the fabric may be comprised of ECDE 75 1/2 warp yarns and ECDE 75 1/4 texturized fill yarns in a double filling weave pattern.

Figure 2:
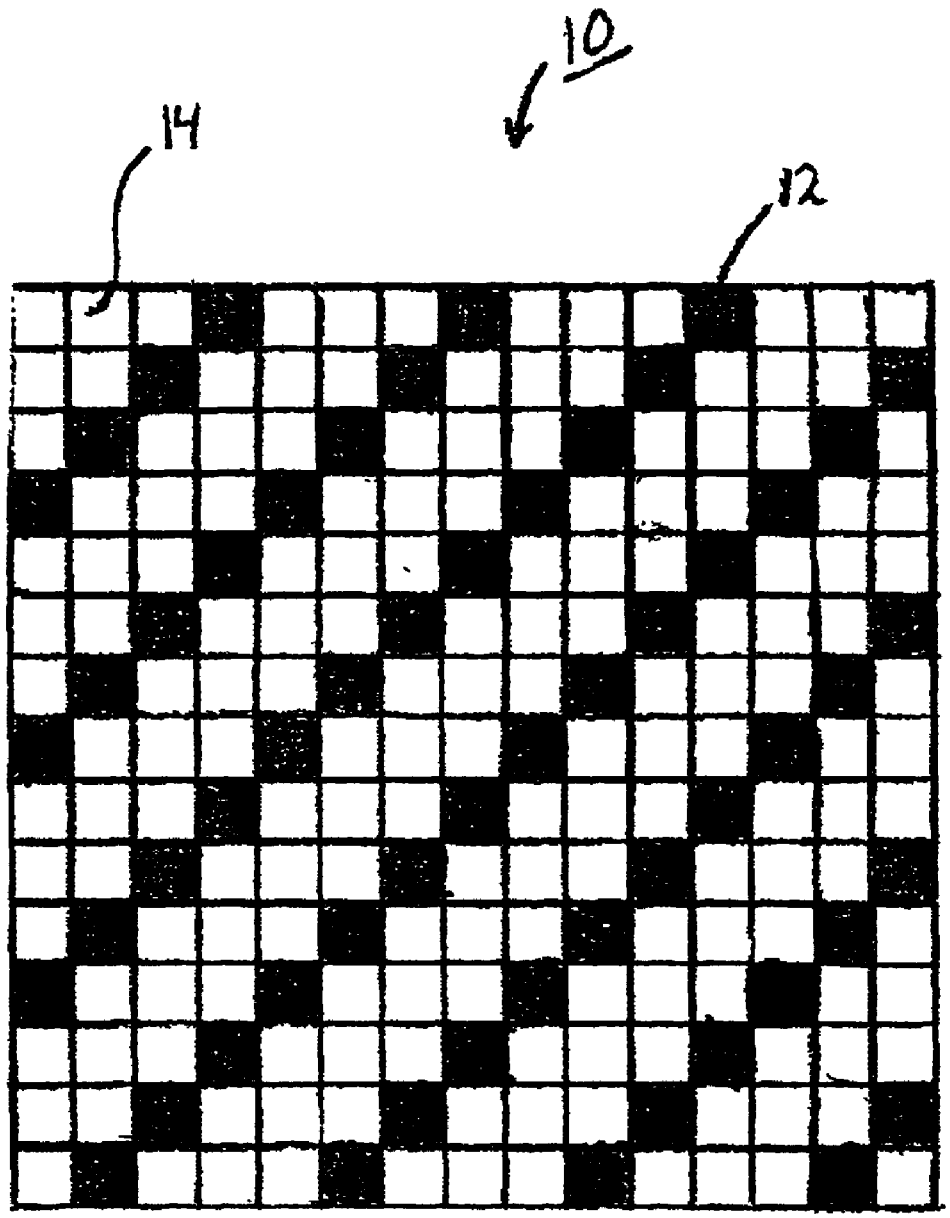
FIG. 2 is a schematic illustration of the weave pattern for the fabric of the present invention.

Textured fill yarns have been found to provide a higher wet pickup than untexturized yarns, particularly for those yarns (the fill yarns) that are benefit on the fabric is subsequently pleated. "Wet pickup" refers to the amount of liquid finish (expressed as a percentage) that a finished fabric will absorb. It has also been found that the weave pattern affects the fabric's adaptability to shaping, i.e. a crisper, stiffer pleat. In a preferred embodiment, and as shown in FIG. 2, the weave pattern is a 1/3 right hand twill. This means that each warp yarn, shown oriented vertically, crosses under 3 fill yarns and over 1 fill yarn in staggered relation. A twill weave is one that is characterized as consisting of one or more warp yarns running over and under two or more fill yarns. Warp yarns are shown as 12 and fill yarns as 14 in FIG. 2. This particular weave has been found to provide optimal pliability, with a wet pickup between about 37 and 42 percent; however, other weave patterns will also provide similar results.

Referring again to FIG. 1, there is shown a cross-sectional schematic view of the treated fabric material 20 of the present invention. After forming the woven fiberglass fabric 22, a stiffening system is applied thereto. This stiffening system comprises three discrete layers 24, 26, and 28 that are sequentially applied. Each of these layers may be applied by any of the conventional finishing methods known in the textile art, including dipping and spraying. The initial, or inner, layer 24 functions as a lubricant for the subsequently applied stiffening layer. This initial layer consists of water, a lubricant, and a polytetrafluorethylene (PTFE) dispersion. The lubricant is preferably a silicon, and more specifically a-phenyl silicon polymer because of its high temperature stability. While the percentages of each ingredient in this mixture can vary widely and still provide acceptable results (phenyl silicon polymer: 5–50%, PTFE dispersion: 1–40%, and water: 10–94%), the preferred mixture and that which provides the optimal results comprises 30% phenyl silicon polymer, 50% water, and 20% PTFE dispersion. It has been found, however, that an initial layer 24 comprised of only water and PTFE, or only of water and a silicon, will still yield acceptable results. After applying this initial lubricating layer 24, the treated fabric is heated until dry. Heating the fabric at approximately 350 degrees Fahrenheit for about 1 minute is sufficient.

Subsequent to drying the initial layer, the intermediate, or stiffening, layer 26 is applied to the fabric. The stiffening layer comprises a resorcinol-formaldehyde resin solution (5–40%), an acrylic resin emulsion (1–10%), ammonia (0.1–2.0%), hexamethylenetetramine (0.1–5.0%), and water (43–93.8%). Alternatively, the stiffening layer may comprise a phenol-formaldehyde resin solution (30%), an acrylic resin emulsion (5)%, ammonia (1.3%), hexamethylenetetramine (2%), and water (61.7%). In lieu of acrylic resin, any suitable thermoplastic may be used. Similarly, a phenol-formaldehyde resin solution may be substituted for the resorcinol-formaldehyde resin solution. This is because the hexamethylenetetramine also releases formaldehyde into the mixture for cross-linking with the phenol-formaldehyde resin, Ammonia is part of the mixture for pH control purposes only and may eliminated, dependent upon the specific composition of the mixture. Following this application the treated fabric is again heated until dry, however, care must be taken to control the temperature so that premature curing and stiffening of the fabric does not occur. This is well understood in the art, and for this material construction, a maximum temperature of 250 degrees Fahrenheit for a duration of one minute is sufficient; however, longer durations at lower temperatures will also provide equally satisfactory drying.

Lastly, the outer, or protective layer 28 is applied. This layer serves as a durable shield against abrasion and erosion of the stiffening layer. The protective layer 28 is comprised of a PTFE dispersion (5–30%) and water (70–95%), with the performed embodiment comprising 20% PTFE dispersion and 80% water. The protective layer is also heated until dry, but again at a temperature not exceeding 250 degrees Fahrenheit and for a duration not to exceed one minute. The fiberglass fabric, having been treated with the stiffening system described above, may now be packaged and stored for later shaping and final curing, or may be immediately shaped and cured.

The treated fabric 20 is pleated using any one of the several commercially available, and well-known, pleating machines. Any one of these machines can be used to pleat the treated fabric 20 of the present invention in pleats having folds 1/4 inches wide with each crease approximately 3/4 inches in depth, although the pleat width and depth are not critical. Because the treated fabric is still in the B-stage, pleating or other shaping is more easily accomplished. Once the pleats are formed, the pleated material may be heat set to complete the curing and stiffening process. An oven or banks of infrared lights located downstream of the pleating operation may provide this heat. For this fabric construction and the stiffening system described herein, heating at about 375 degrees Fahrenheit for about 45 seconds is sufficient to finish the pleated material. The pleated, stiffened fabric is now suitable for use in high-temperature applications. The surface area of the pleated filter fabric is two to three times the filtration surface area of conventional "flat" filters, depending upon the width and depth of the pleats. The fabric also has a permeability of approximately 25–35 cubic feet per minute when tested in accordance with ASTM D737, "Standard Test Method for Air Permeability of Textile Fabrics". Additionally, the finished fabric has a filtration efficiency of greater than 99% for particulate matter of 10 microns or larger.

Figure 3:
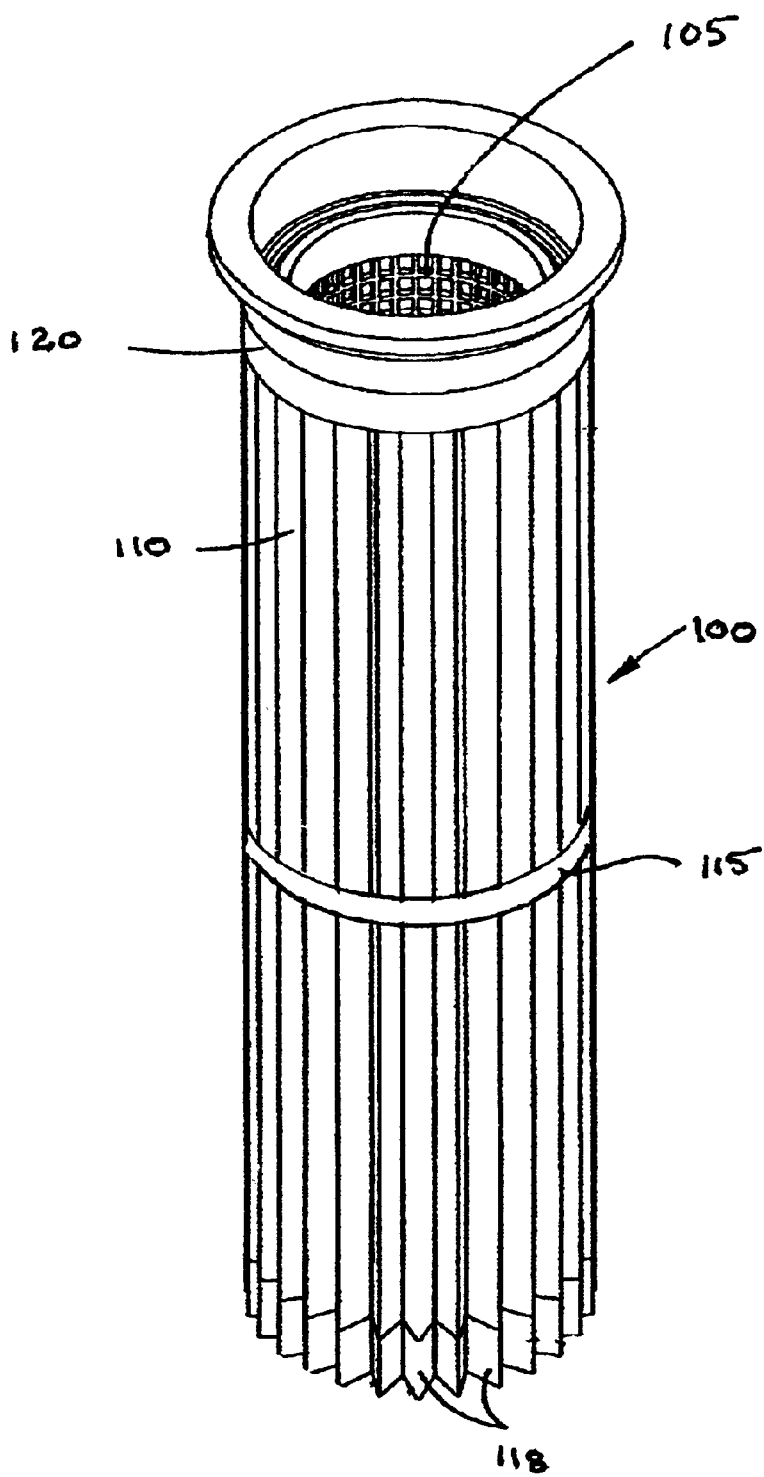
FIG. 3 is a front perspective view of a filter device constructed according to a preferred embodiment of the present invention.

In an alternative embodiment, the treated fabric 20 is incorporated into a filter device, shown generally as 100 in FIG. 3. While a cartridge-type filter device is shown, those skilled in the art will readily appreciate that there are numerous shapes, sizes, and configurations for filtering devices incorporating fabric 20, depending upon the specific application. Here, filter device 100 comprises a perforated linen 105, pleated fabric filter material 110, flanges 120, and at least one retainer 115. The perforated liner 105 is a metallic cylindrically shaped screen or mesh that is open on the ends. The sizes and shapes of the perforations in the liner 105 are not critical to the present invention so long as the perforations provide optimal air passage and adequate structural support for filter material 110. Filter material 110 is placed or wrapped around the entire cylindrical surfaces of liner 105. Any conventional technique for overlapping or joining longitudinal ends of the filter material 110 to ensure the ends are adequately jointed together may be used. End caps, or flanges, 120 (only the upper end cap is shown in FIG. 3) are fitted over the ends of the filter material 110 and liner 105 to secure them together in place. The end caps are also preferably metallic. To hold the pleats in relative pleated position within the end caps, a potting compound (not shown) is used. A potting compound is a material that embeds the ends in place and solidifies so that the ends are rigidly held during operation. One suitable potting compound is Duralco 4703, manufactured by Cotronics Corporation of Brooklyn, N.Y. Finally, at least one retainer 115 such as a metallic band or strap is secured around the outer periphery of the filter material 110 so that the band does not compress or crush the pleats 118, but fits snugly against the pleats 118. Retainer 115 serves to maintain the integrity and form of the filter material 110 when air is reverse-flowed through the perforated liner 105 during the cleaning cycles.

In operation, a gaseous process or exhaust stream flows through the filter material 110 and though the liner 105, discharging into a clean plenum through one or both ends of cartridge filter 100. Cleaning cycles are typically initiated at specified intervals or when the pressure differential across the filter material 110 reaches a predetermined level. When that occurs, clean air is forced from an air source from within the cartridge 100 and out through the filter material 110.

The cartridge filter 100 constructed accordingly to the present invention will provide acceptable service through well over one hundred thousand cleaning cycles in accordance with testing performed under ASTM D2176, "Standard Test Method for Folding Endurance for Paper". Using this standard, strips of fabric are loaded into a flex tester where they are flexed to failure.

Certain modifications and improvements will occur to those skilled in the art upon reading the foregoing description It should be understood that all such modifications and improvements have been omitted for the sake of conciseness and readability, but are properly within the scope of the following claims.

I claim:

1. A fabric filter having a stiffener applied thereto for high temperature gaseous filtration applications, comprising:
   (a) a fabric material capable of withstanding operating temperatures of at least about 450 degrees Fahrenheit for prolonged periods of time without deformation or deterioration; and
   (b) a chemical stiffener applied to said fabric material, wherein the chemical stiffener is comprised of a resorcinol-formaldehyde resin solution.

2. The fabric filter of claim 1 wherein said material is fiberglass.

3. The fabric filter of claim 1 wherein said fabric is woven.

4. The fabric filter of claim 3 wherein said fabric is woven with fiberglass ECDE yarns.

5. The fabric filter of claim 1 wherein the stiffener is further comprised of acrylic resin emulsion, hexamethylenetetramine, and water.

6. The fabric filter of claim 5 wherein the stiffener is further comprised of ammonia.

7. The fabric filter of claim 5 wherein said chemical stiffener is comprised of about 5 to 40 percent resorcinol-formaldehyde resin solution, about 1 to 10 percent acrylic resin emulsion, about 0.1 to 2 percent ammonia, about 0.1 to 5 percent hexamethylenetetramine, and about 43 to 93.8 percent water.

8. The fabric filter of claim 7 wherein said chemical stiffener is comprised of about 30 percent resorcinol-formaldehyde resin solution, about 5 percent acrylic resin emulsion, about 1.3 percent ammonia, about 2 percent hexamethylenetetramine, and about 61.7 percent water.

9. The fabric filter of claim 1 further including a first applied lubricant comprised of water and a silicone lubricant.

10. The fabric filter of claim 1 further including a first applied lubricant comprised of water and a dispersion of polytetrafluorethylele.

11. The fabric filter of claim 1 further including a first applied lubricant comprised of water, a silicone lubricant, and a dispersion of polytetrafluorethylene.

12. The fabric filter of claim 11 wherein the first applied lubricant is comprised of about 5 to 50 percent phenol silicon polymer, about 1 to 40 percent polytetrafluorethylene dispersion, and about 10 to 94 percent water.

13. The fabric filter of claim 1 further including a last applied protective layer comprised of a dispersion of polytetrafluorethylene and water.

14. The fabric filter of claim 13 wherein the last applied protective layer is comprised of about 5 to 30 percent polytetrafluorethylene dispersion and about 70 to 95 percent water.

15. The fabric filter of claim 14 wherein the last applied protective layer is comprised of about 20 percent polytetrafluorethylene dispersion and about 80 percent water.

16. The fabric filter of claim 1 wherein the fabric material is suitable for filtration at temperatures between about 450 degrees Fahrenheit and 550 degrees Fahrenheit.

17. The fabric material of claim 1 wherein the fabric material is so formed that openings within the fabric are no larger than about 10 microns.

18. The fabric material of claim 1 wherein the stiffened fabric material is pleated to provide increased filtration area.

19. A fibrous fabric filter having a stiffening system applied thereto for maintaining form in high temperature filtration applications, comprising:
   (a) a fibrous fabric material capable of withstanding operating temperatures of at least 450 degrees Fahrenheit for prolonged periods of time without deformation or deterioration;
   b) a stiffening system comprising:
      (i) an inner treatment layer applied to said fibrous fabric material, said inner treatment layer comprising water, a silicone lubricant, and a dispersion of polytetrafluorethylene;
      (ii) an intermediate treatment layer applied to said inner treatment layer, said intermediate treatment layer comprising a resorcinol-formaldehyde resin solution, acrylic resin emulsion, ammonia, hexamethylenetetramine, and water;
      (iii) an outer treatment layer applied to said intermediate treatment layer, said outer treatment layer comprising a dispersion of polytetrafluorethylene and water; and
   (c) the fibrous fabric material being pleated to increase the surface area.

20. The fibrous fabric filter of claim 19 wherein said fabric is woven with fiberglass ECDE yarns.

21. The fibrous fabric filter of claim 19 wherein said inner treatment layer is comprised of about 5 to 50 percent phenol silicon polymer, about 1 to 40 percent polytetrafluorethylene dispersion, and about 10 to 94 percent water.

22. The fibrous fabric filter of claim 21 wherein said inner treatment layer is comprised of about 30 percent phenol silicon polymer, about 20 percent polytetrafluorethylene dispersion, and about 50 percent water.

23. The fibrous fabric filter of claim 19 wherein said intermediate treatment layer is comprised of about 5 to 40 percent resorcinol-formaldehyde resin solution, about 1 to 10 percent acrylic resin emulsion, about 0.1 to 2 percent ammonia, about 0.1 to 5 percent hexamethylenetetramine, and about 43 to 93.8 percent water.

24. The fibrous fabric filter of claim 23 wherein said intermediate treatment layer is comprised of about 30 percent phenol formaldehyde resin solution, about 5 percent acrylic resin emulsion, about 1.3 percent ammonia, about 2 percent hexamethylenetetramine, and about 61.7 percent water.

25. The fibrous fabric filter of claim 19 wherein said outer treatment layer is comprised of about 5 to 30 percent polytetrafluorethylene dispersion and about 70 to 95 percent water.

26. The fibrous fabric filter of claim 25 wherein said outer treatment layer is comprised of about 20 percent polytetrafluorethylene dispersion and about 80 percent water.

27. The fabric filter of claim 19 wherein the fabric material is suitable for filtration at temperatures between about 450 degrees Fahrenheit and 550 degrees Fahrenheit.

28. The fabric filter of claim 19 wherein the filtration efficiency of the stiffened fabric material is greater than 99 percent for particulate matter of about 10 microns or larger.

29. A fabric filter having a stiffener applied thereto for high temperature gaseous filtration applications, comprising:
   (a) a fabric material capable of withstanding operating temperatures of at least about 450 degrees Fahrenheit for prolonged periods of time without deformation or deterioration; and
   (b) a chemical stiffener applied to said fabric material, wherein the chemical stiffener is comprised of a phenol-formaldehyde resin solution.

30. The fabric filter of claim 29 wherein said material is fiberglass.

31. The fabric filter of claim 29 wherein said fabric is woven.

32. The fabric filter of claim 31 wherein said fabric is woven with fiberglass ECDE yarns.

33. The fabric filter of claim 29 wherein the stiffener is further comprised of acrylic resin emulsion, hexamethylenetetramine, and water.

34. The fabric filter of claim 33 wherein the stiffener is further comprised of ammonia.

35. The fabric filter of claim 29 further including a first applied lubricant comprised of water and a silicone lubricant.

36. The fabric filter of claim 29 further including a first applied lubricant comprised of water and a dispersion of polytetrafluorethylele.

37. The fabric filter of claim 29 further including a first applied lubricant comprised of water, a silicone lubricant, and a dispersion of polytetrafluorethylene.

38. The fabric filter of claim 37 wherein the first applied lubricant is comprised of about 5 to 50 percent phenol silicon polymer, about 1 to 40 percent polytetrafluorethylene dispersion, and about 10 to 94 percent water.

39. The fabric filter of claim 29 further including a last applied protective layer comprised of a dispersion of polytetrafluorethylene and water.

40. The fabric filter of claim 39 wherein the last applied protective layer is comprised of about 5 to 30 percent polytetrafluorethylene dispersion and about 70 to 95 percent water.

41. The fabric filter of claim 40 wherein the last applied protective layer is comprised of about 20 percent polytetrafluorethylene dispersion and about 80 percent water.

42. The fabric filter of claim 29 wherein the fabric material is suitable for filtration at temperatures between about 450 degrees Fahrenheit and 550 degrees Fahrenheit.

43. The fabric material of claim 29 wherein the fabric material is so formed that openings within the fabric are no larger than about 10 microns.

44. The fabric material of claim 29 wherein the stiffened fabric material is pleated to provide increased filtration area.

* * * * *